United States Patent
Zebuhr (10) Patent No.: US 10,046,250 B2
(45) Date of Patent: Aug. 14, 2018

(54) SYSTEM FOR PROCESSING WATER AND GENERATING ELECTRICITY, RANKINE

(71) Applicant: Aquaback Technologies, Inc., Tewskbury, MA (US)

(72) Inventor: William H. Zebuhr, Nashua, NH (US)

(73) Assignee: AQUABACK TECHNOLOGIES, INC., Salem, NH (US)

( * ) Notice: Subject to any disclaimer, the term of this patent is extended or adjusted under 35 U.S.C. 154(b) by 817 days.

(21) Appl. No.: 14/488,423

(22) Filed: Sep. 17, 2014

(65) Prior Publication Data

US 2015/0075967 A1 Mar. 19, 2015

Related U.S. Application Data

(60) Provisional application No. 61/879,266, filed on Sep. 18, 2013.

(51) Int. Cl.
*B01D 1/28* (2006.01)
*B01D 1/00* (2006.01)
(Continued)

(52) U.S. Cl.
CPC ......... *B01D 1/2893* (2013.01); *B01D 1/0052* (2013.01); *B01D 1/0058* (2013.01);
(Continued)

(58) Field of Classification Search
CPC .................. B01D 1/28–1/2896; B01D 1/2887
See application file for complete search history.

(56) References Cited

U.S. PATENT DOCUMENTS

| 3,412,558 | A | * | 11/1968 | Starmer | ................. | B01D 3/065 |
| | | | | | | 202/163 |
| 3,468,762 | A | | 9/1969 | Klitzsch | | |

(Continued)

FOREIGN PATENT DOCUMENTS

| FR | 487 669 A | 7/1918 | |
| GB | 1091616 A | * 11/1967 | ........... B01D 1/2853 |
| WO | WO 81/02088 | 8/1981 | |

OTHER PUBLICATIONS

Mahmoud Shatat, Saffa B. Riffat; Water desalination technologies utilizing conventional and renewable energy sources, International Journal of Low-Carbon Technologies, vol. 9, Issue 1, Mar. 1, 2014, pp. 1-19, https://doi.org/10.1093/ijlct/cts025.*

(Continued)

*Primary Examiner* — Bobby Ramdhanie
*Assistant Examiner* — Briana M Obenhuber
(74) *Attorney, Agent, or Firm* — Hamilton, Brook, Smith & Reynolds, P.C.

(57) ABSTRACT

A distilling device having a vapor compression distiller. The vapor compression distiller can include a reservoir for receiving liquid for distillation. Evaporation surfaces can receive the liquid and evaporate the liquid into evaporated vapor for subsequent condensing. Condensing surfaces can receive the vapor and condense the vapor into distillate. A compressor can deliver the vapor to the condensing surfaces. The distilling device can also include an engine that produces heat. A boiler can be heated by the heat from the engine for producing a working vapor. A vapor turbine can be driven by the working vapor. The vapor turbine can be mechanically coupled to the compressor for mechanically driving the compressor, thereby reducing electrical power needs of the vapor compression distiller.

42 Claims, 2 Drawing Sheets

(51) Int. Cl.
 *B01D 5/00* (2006.01)
 *C02F 1/16* (2006.01)
 *C02F 1/04* (2006.01)
 *C02F 1/18* (2006.01)

(52) U.S. Cl.
 CPC .......... *B01D 1/2896* (2013.01); *B01D 5/006* (2013.01); *C02F 1/041* (2013.01); *C02F 1/16* (2013.01); *C02F 1/18* (2013.01); *C02F 2201/008* (2013.01)

(56) References Cited

U.S. PATENT DOCUMENTS

| | | | |
|---|---|---|---|
| 4,051,680 | A | 10/1977 | Hall |
| 4,873,829 | A | 10/1989 | Williamson |
| 4,873,840 | A | 10/1989 | Gilliusson |
| 6,125,632 | A | 10/2000 | Hansen et al. |
| 7,708,865 | B2 | 5/2010 | Holtzapple et al. |
| 8,021,519 | B2 | 9/2011 | Paxton |
| 8,202,402 | B2 | 6/2012 | Capan |
| 8,226,800 | B2 | 7/2012 | Passarelli |
| 8,584,472 | B2 | 11/2013 | Kamen et al. |
| 8,631,653 | B1 | 1/2014 | Henss et al. |
| 8,647,477 | B2 | 2/2014 | Govindan et al. |
| 8,858,758 | B2 | 10/2014 | Zebuhr |
| 2004/0219400 | A1* | 11/2004 | Al-Hallaj .............. C02F 1/041 429/424 |
| 2005/0016828 | A1 | 1/2005 | Bednarek et al. |
| 2012/0037488 | A1* | 2/2012 | Zebuhr ................. B01D 1/225 203/4 |
| 2012/0085635 | A1* | 4/2012 | Haynes ............... B01D 1/0035 203/11 |
| 2012/0199534 | A1 | 8/2012 | Holtzapple et al. |
| 2013/0043118 | A1 | 2/2013 | Kaminski et al. |
| 2013/0175155 | A1 | 7/2013 | Lee et al. |

OTHER PUBLICATIONS

Rose, Charles D. "Current Design and Applications of Marine Evaporators ." Marine Technology, vol. 20, No. No. 4, Oct. 1983, pp. 348-355., doi:http://www.sname.org/HigherLogic/System/DownloadDocumentFile.ashx?DocumentFileKey=1961431a-5fa3-42a1-b765-80f8504b062f.*

Smith, Paul G, and John S Scott. Dictionary of Water and Waste Management. 2nd ed., IWA Publishing, 2005. p. 279.*

International Search Report and Written Opinion, for Int'l Appl. No. PCT/US2014/056008, entitled "System For Processing Water And Generationg Electricity, Rankine,", Date of Communication: Feb. 23, 2016.

International Preliminary Report on Patentability for Int'l Appl. No. PCT/US2014/056008, entitled "System For Processing Water And Generationg Electricity, Rankine,", Date of Communication: Mar. 31, 2016.

Sembier, W., "A hybrid solid-oxide fuel cell—rankine cycle to supply shipboard electrical power", Dissertations & Theses—Gradworks, Polytechnic Institute of New York University, 2009.

* cited by examiner

SYSTEM FOR PROCESSING WATER AND GENERATING ELECTRICITY, RANKINE

RELATED APPLICATION

This application claims the benefit of U.S. Provisional Application No. 61/879,266, filed on Sep. 18, 2013. The entire teachings of the above application are incorporated herein by reference.

BACKGROUND

Vapor compressor distillers require electrical power consumption for processing incoming influent liquid into a purified liquid, such as water. Energy costs can be a consideration if the distiller is operated for long periods of time.

SUMMARY

The present invention can provide a device or system for processing liquids such as water which can have reduced electrical power needs and which can also produce electricity.

The present invention can include a distilling device having a vapor compression distiller. The vapor compression distiller can include a reservoir for receiving liquid for distillation. Evaporation surfaces can receive the liquid and evaporate the liquid into evaporated vapor for subsequent condensing. Condensing surfaces can receive the vapor and condense the vapor into distillate. A compressor can deliver the vapor to the condensing surfaces. The distilling device can also include an engine that produces heat. A boiler can be heated by the heat from the engine for producing a working vapor. A vapor turbine can be driven by the working vapor. The vapor turbine can be mechanically coupled to the compressor for mechanically driving the compressor, thereby reducing electrical power needs of the vapor compression distiller.

In particular embodiments, the working vapor can be steam and the vapor turbine can be a steam turbine. The engine can be included in an electric generator for generating electricity for powering selected components of the distilling device. In one embodiment, the electric generator can include an internal combustion engine. In another embodiment, the electric generator can include a solid oxide fuel cell (SOFC) that provides waste heat. The vapor compression distiller and the SOFC can be enclosed within a generally cylindrical dewar. The vapor compression distiller and the SOFC can be separated from each other by a sealed barrier. The sealed barrier can form a sump for the vapor compression distiller, for storing liquid for distillation. At least a portion of water provided to the boiler can be provided from at least one of exhaust steam from the turbine and distillate from the condensing surfaces. At least a portion of exhaust steam from the steam turbine can be delivered to the condensing surfaces for condensing into distillate. The vapor compression distiller can be mounted to a vehicle and the engine can drive the vehicle. In some embodiments, fuel combustion can heat the boiler. In some embodiments, a multiple effect thermal system can be included to concentrate, dry and burn solids separated from the liquid received by the vapor compression distiller during distillation. Heat produced by burning can supplement heat from the electric generator, which can be used for heating the boiler. The compressor and the steam turbine can be mounted to a common shaft positioned along a central axis of the vapor compression distiller, and can rotate in unison. At least a portion of exhaust steam from the steam turbine can be used to preheat water provided to the boiler.

The present invention can also provide a distilling device including a vapor compression distiller having a reservoir for receiving liquid for distillation. Evaporation surfaces can receive the liquid and evaporate the liquid into vapor. Condensing surfaces can receive the vapor and condense the vapor into distillate. A compressor can deliver the vapor to the condensing surfaces. The distilling device can further include an engine that emits high temperature waste heat. A boiler can be heated by the waste heat from the engine for producing steam. A steam turbine can be driven by the steam. The steam turbine can be mechanically coupled to the compressor for mechanically driving the compressor, thereby reducing electrical power needs of the vapor compression distiller. At least a portion of water provided to the boiler can be provided from the distillate from the condensing surfaces.

In particular embodiments, at least a portion of exhaust steam from the steam turbine can be delivered to a heat exchanger for preheating the water entering the boiler, before being delivered to the condensing surfaces for condensing into distillate. The vapor compression distiller can be mounted to a vehicle, and the engine can drive the vehicle.

The present invention can also provide a distilling device including a vapor compression distiller having a reservoir for receiving liquid for distillation. Evaporation surfaces can receive the liquid and evaporate the liquid into vapor. Condensing surfaces can receive the vapor and condense the vapor into distillate. A compressor can deliver the vapor to the condensing surfaces. The distilling device can also include a combustor for combusting fuel and producing heat. A boiler can be heated by heat from the combustor for producing steam. The boiler can be provided with distillate from the condensing surfaces. A steam turbine can be driven by the steam. The steam turbine can be mechanically coupled to the compressor for mechanically driving the compressor, thereby reducing the electrical power needs of the vapor compression distiller. At least a portion of exhaust steam from the steam turbine can be delivered to the condensing surfaces for condensing into distillate.

In particular embodiments, at least a portion of the exhaust steam from the steam turbine is delivered to a heat exchanger for preheating water entering the boiler. A multiple effect thermal system can concentrate, dry and burn solids separated from the liquid received by the vapor compression distiller during distillation. The multiple effect thermal system can be driven by the combustor.

The present invention can also provide a method of distilling liquid with a distilling device, that includes a vapor compression distiller which can receive liquid in a reservoir for distillation. The liquid can be applied onto evaporation surfaces and the liquid can be evaporated into evaporated vapor for subsequent condensing. The vapor can be delivered onto condensing surfaces and the vapor can be condensed into distillate. The vapor can be delivered to the condensing surfaces by a compressor. The distilling device can include an engine that produces heat. A boiler can be heated with the heat from the engine for producing a working vapor. A vapor turbine can be driven with the working vapor. The vapor turbine can be mechanically coupled to the compressor for mechanically driving the compressor, thereby reducing electrical power needs of the vapor compression distiller.

In particular embodiments, steam can be produced with the boiler as the working vapor, and the vapor turbine can be configured as a steam turbine. The engine can be included in an electric generator for generating electricity for powering selected components of the distilling device. In one embodiment, the electric generator can be provided with an internal combustion engine. In another embodiment, the electric generator can be provided with a solid oxide fuel cell (SOFC) that provides waste heat. The vapor compression distiller and the SOFC can be enclosed within a generally cylindrical dewar. The vapor compression distiller and the SOFC can be separated from each other by a sealed barrier. The sealed barrier can be configured into a sump for the vapor compression distiller, for storing liquid for distillation. At least a portion of water provided to the boiler can be provided from at least one of exhaust steam from the turbine and distillate from the condensing surfaces. At least a portion of exhaust steam from the steam turbine can be delivered to the condensing surfaces for condensing into distillate. The vapor compression distiller can be mounted to a vehicle and the vehicle can be driven with the engine. Fuel can be combusted to heat the boiler. In some embodiments, a multiple effect thermal system can be provided for concentrating, drying and burning solids separated from the liquid received by the vapor compression distiller during distillation. Heat produced by burning can supplement heat from the electric generator, which can be used for heating the boiler. The compressor and the steam turbine can be mounted to a common shaft positioned along a central axis of the vapor compression distiller, and rotated in unison. At least a portion of exhaust steam from the steam turbine can be used to preheat water provided to the boiler.

The present invention can also provide a method of distilling liquid with a distilling device including a vapor compression distiller that can receive liquid in a reservoir for distillation. The liquid can be applied onto evaporation surfaces and the liquid can be evaporated into vapor. The vapor can be delivered onto condensing surfaces and the vapor can be condensed into distillate. The vapor can be delivered to the condensing surfaces by a compressor. The distilling device can include an engine and high temperature waste heat can be emitted from the engine. A boiler can be heated with the waste heat from the engine for producing steam. A steam turbine can be driven by the steam. The steam turbine can be mechanically coupled to the compressor for mechanically driving the compressor, thereby reducing electrical power needs of the vapor compression distiller. At least a portion of water provided to the boiler can be provided from the distillate from the condensing surfaces.

In particular embodiments, at least a portion of exhaust steam from the steam turbine can be delivered to a heat exchanger for preheating the water entering the boiler, before being delivered to the condensing surfaces for condensing into distillate. The vapor compression distiller can be mounted to a vehicle and the vehicle can be driven with the engine.

The present invention can also provide a method of distilling liquids with a distilling device including a vapor compression distiller that can receive liquid in a reservoir for distillation. The liquid can be applied onto evaporation surfaces and the liquid evaporated into vapor. The vapor can be delivered onto condensing surfaces and the vapor can be condensed into distillate. The vapor can be delivered to the condensing surfaces by a compressor. The distilling device can include a combustor in which fuel can be combusted and produce heat. A boiler can be heated with the heat from the combustor for producing steam. The boiler can be provided with distillate from the condensing surfaces. A steam turbine can be driven with the steam. The steam turbine can be mechanically coupled to the compressor for mechanically driving the compressor, thereby reducing electrical power needs of the vapor compression distiller. At least a portion of exhaust steam from the steam turbine can be delivered to the condensing surfaces for condensing into distillate.

In particular embodiments, at least a portion of exhaust steam from the steam turbine can be delivered to a heat exchanger for preheating water entering the boiler. A multiple effect thermal system can be provided for concentrating, drying and burning solids separated from the liquid received by the vapor compression distiller during distillation. The multiple effect thermal system can be driven by the combustor.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
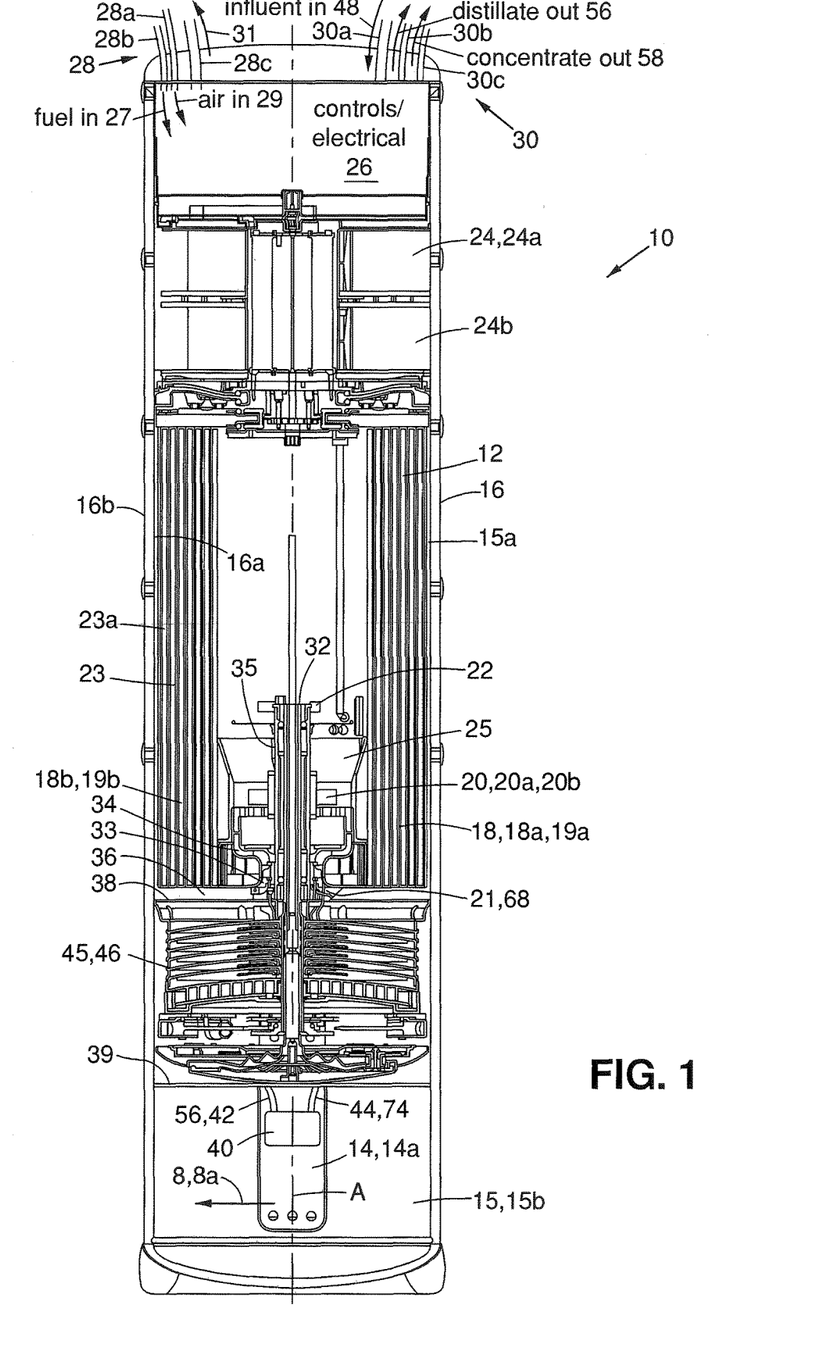
FIG. 1 is a simplified sectional drawing of one embodiment of a distilling device or system in the present invention.

Referring to FIG. 1, in one embodiment, distilling device 10 can be a system or device that can process liquids such as water, and generate electricity. Distilling device 10 can include a vapor compression distiller 12 and an electric generator 14, which can be positioned, enclosed or contained within the interior 15 of a dewar 16, that can form an upright outer housing. The dewar 16 can have an elongate generally cylindrical shape, with inner 16a and outer 16b walls separated by a gap which can be under a vacuum, for forming a high or efficient insulating housing to contain heat therein. The dewar 16 can have reflection shields on the inner walls 16a, to reduce heat loss and improve the life of the dewar 16. The vapor compression distiller 12 can be positioned above and separated from the electric generator 14 that is below, by a sealed barrier wall 38 which can extend laterally across the dewar 16. The wall 38 forms a gas/liquid or water tight or proof barrier, container or tray that can serve as the container, sump or reservoir 36 in the upper interior space 15a of dewar 16 for the distiller 12, for receiving incoming liquid influent 48 to be processed or distilled. The wall 38 can prevent liquid 48 in the sump 36 in the upper interior space 15a of the dewar 16 from entering into the lower interior space 15b of the dewar 16 where the electric generator 14 is contained below, or gas such as air from the lower interior space 15b from entering into the upper interior space 15a where the vapor compression distiller 12 is contained. The electrical generator 14 can provide electric power to selected electrical components in the distilling device 10 and the vapor compression distiller 12, such as the electrical controls 26, and any desired motors, and waste heat produced by the electric generator 14 can be used by the vapor compression distiller 12 during operation to reduce the electrical power needs of the vapor compression distiller 12, thereby increasing electrical efficiency.

Figure 2:
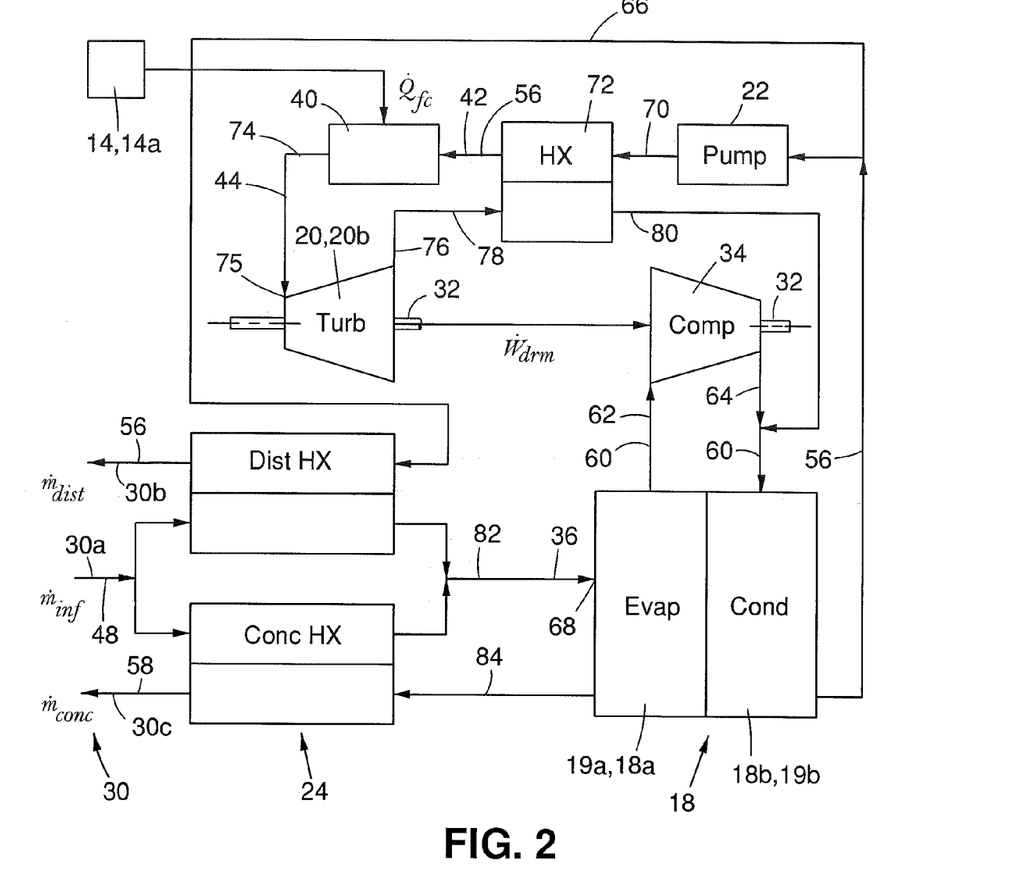
FIG. 2 is a schematic drawing of a portion of components of a distilling device or system in the present invention, and the flow of liquid, vapor or steam therebetween.

The vapor compression distiller 12 can have a series of inlet and outlet tubes 30 for delivering liquid influent 48 into the distiller 12 via inlet tube 30a, discharging liquid distillate 56 such as processed or purified water out via outlet tube 30b, and discharging concentrate or concentrated liquid 58 left over from the distillation process out via outlet tube 30c. The liquid influent 48, the distillate 56 and the concentrate 58 can pass through a counter flow heat exchanger 24 located in the upper interior space 15a, to heat the incoming liquid influent 48 before it reaches the sump 36, while at the same time removing heat from and cooling the exiting or outgoing distillate 56 and concentrate 58. The counter flow heat exchanger 24 can have two stages 24a and 24b. A rotatable sump pump 21 can be rotatably mounted about a shaft 32 positioned along the central longitudinal axis A of the distiller 12 and dewar 16. A generally cylindrical evaporator/condenser 18 can be positioned above the sump 36 in the upper interior space 15a. The evaporator/condenser 18 can have an evaporator 18a and a condenser 18b. The sump pump 21 along with a liquid applicator or delivery system 68, can pump and deliver or apply liquid influent 48 from the sump 36 to cylindrical evaporating surfaces 19a of the evaporator 18a in the evaporator/condenser 18, for evaporating into vapor or steam 60 (FIG. 2). The evaporator/condenser 18 can include a series of concentric cylindrical members 23 with a number annular spaces or chambers 23a therebetween, in which the evaporating surfaces 19a of the evaporator 18a can be located on one of the sides of the cylindrical members 23. The condensing surfaces 19b of the condenser 18b can be located on the opposite sides of the cylindrical members 23. The vapor or steam compressor or pump 34 can pump or draw evaporated vapor 60 from the evaporating surfaces 19a, compressing the vapor 60 and delivering or applying the compressed vapor 60 to the condensing surfaces 19b for condensing into liquid distillate 56. The distillate 56 can be pumped by a distillate pump 35 for exiting the distilling device 10 via outlet 30b. The left over liquid concentrate 58 can be pumped by a concentrate pump 33 for exiting the distilling device 10 via outlet 30c. The concentrate pump 33 and distillate pump 35 can be rotatably mounted about shaft 32 and axis A. Features of the vapor compression distiller 12 including the tubes 30, counter flow vent exchanger 24, sump 36, evaporator/condenser 18 with liquid applicator or delivery system 68, and pumps 21, 33 and 35, among other selected features, can be similar to that described in U.S. patent application Ser. No. 13/185, 894 filed Jul. 19, 2011, Publication No. 2012/0037488, published Feb. 16, 2012, the contents of which are incorporated herein by reference in its entirety.

The electric generator 14, can be mounted within the lower or bottom interior space 15b of the dewar 16, such as by a wall, strut or bracket 39. The electric generator 14 can be a fuel cell 14a that can include or consist of a solid oxide fuel cell (SOFC) as known in the art, that generates electricity while at the same time producing high temperature waste heat, which in some embodiments, can be as high as 500-1000° C. (932-1832° F.). The electric generator 14 and/or the fuel cell 14a can be positioned along axis A. A series of tubes 28 can provide the fuel cell 14a with a fuel 27 via tube 28b, and air 29 via tube 28a, for operation. The fuel 27 can be a hydrocarbon fuel, such as methane, propane, butane, etc., or other suitable fuels known in the art. The fuel cell 14a can produce power or electricity 8, at least a portion of which can operate selected components of the distilling device 10 and vapor compression distiller 12, including the electrical controls 26, and selected motors. The electrical power or electricity 8 that is generated can be conveyed via power line 8a from electric generator 14 to selected locations, terminals, junctions or devices. Additional available power or electricity can be used to operate other selected devices. Exhaust 31, which can include gases and particles, can exit distilling device 10 via exhaust outlet tube 28c.

A boiler 40 for generating a working vapor such as steam 74 can be positioned above the fuel cell 14a, and/or in thermal communication with heat generated by the fuel cell 14a. The boiler 40 can be positioned along axis A in alignment with fuel cell 14a. Positioning or aligning the fuel cell 14a below the boiler 40 can allow heat from the fuel cell 14a to rise under the boiler 40 for heating. Liquid such as water, which can be or include liquid distillate 56 from the condenser 18b of the evaporator/condenser 18, can be supplied to the boiler 40 through a supply tube or conduit 42. The distillate 56 or liquid can be pumped to the boiler 40 by a liquid distillate or boiler supply pump 22, which can be a rotary centrifugal pump rotatably mounted about shaft 32 and axis A. The boiler supply pump 22 can be in a fluid communication with the condenser 18b by conduits for receiving liquid distillate 56, as well as in fluid communication with the boiler 40 via conduit 42. Steam 74 generated by the boiler 40 can exit the boiler 40 through delivery tube or conduit 44. The boiler 40 can also be in fluid communication with a vapor or steam turbine 20 having turbine blades 20b, via conduit 44, for mechanically driving the turbine 20 with working vapor or steam 74 from the boiler 40. The turbine 20 can be rotatably mounted about shaft 32, and can be mechanically coupled, attached or connected to the vapor compressor 34. The turbine 20 and the vapor compressor 34 can both be included on, attached, connected to or a part of a rotor assembly 25 to rotate in unison about a common shaft 32. This can provide efficient power transfer from the turbine 20 to the vapor compressor 34, limiting power transmission losses. The turbine 20, compressor 34 and/or rotor assembly 25 can have a hub 20a with water bearings for providing rotation about shaft 32, that can be lubricated with distillate 56 and cooled by the evaporation of the distillate 56. The sump pump 21, concentrate pump 33, distillate pump 35 and boiler supply pump 22 can also be included, attached, connected to , or part of the rotor 25 if desired, for rotation about shaft 32 in unison. Alternatively, selected pumps 21, 22, 33 and 35 can be driven separately from vapor compressor 34 and/or from each other, which can be by an electric motor or motors. In some embodiments, shaft 32 is stationary and the rotating components are rotatably mounted about the shaft 32 such as with bearings or bushings. In other embodiments, the shaft 32 or selected portions thereof, can be fixed to selected components and the shaft 32 and/or selected portions and selected components rotated.

By mechanically driving the vapor compressor 34 by the turbine 20 with steam 74, the vapor compressor 34 does not need to be driven by an electric motor. If an electric motor were to run the vapor compressor 34, it can use most or a considerable amount of the electric power delivered to the distilling device 10. Consequently, eliminating the need for electrically driving the vapor compressor 34 can reduce the electrical power needs or requirements of the vapor compression distiller 12 by a significant amount, for example by about 150 watts of power for a 20 gal/hr. vapor compression distiller 12. Driving the turbine 20 and compressor 34 with steam 74 can be accomplished efficiently, since liquid distillate 56 fed or delivered to the boiler 40 from the condenser 18*b* is already at an elevated temperature by recently being condensed from vapor 60.

In some embodiments, the distilling device 10 can include a multiple effect thermal system 46 as known in the art, which can be mounted to and/or below the barrier wall 38, and positioned in the lower interior space 15*b* of the dewar 16. The multiple effect thermal system 46 can be positioned above the electric generator 14 and boiler 40, for further concentrating, drying and burning solids into ash from the heat processed liquid influent 48, for example from the concentrate 58, with a combustor 45. The multiple effect thermal system 46 can be positioned or aligned along axis A. The heat produced can supplement the heat produced by the electric generator 14 for heating boiler 40 or working vapor or steam 74 and/or concentrating and drying the solids. The multiple effect thermal system 46 can be driven by fuel cell 14*a* or can be driven by the combustion of fuel 27 in air 29. The heat from the combustion of fuel 27 can dry the concentrate 58 with a heat exchanger and start combustion of combustible solids from the dried concentrate 58 in a separate stream of air, which can be air 29 that supports the combustion of fuel 27, and then exhausted via exhaust outlet 28*c* from the system by gas flow. The combustion of products of both the fuel 27 and combustible solids can form exhaust 31 that can be driven out of the system by the flow of gas, which can include the flow of incoming air 29 and fuel 27. Processing the concentrate liquid 58 can allow 98% of the water in the incoming liquid influent 48 to be distilled, in some embodiments.

FIG. 2 is a schematic drawing in an embodiment of the present invention, showing various connections between components, which can include fluid communication, mechanical, vapor, liquid and gas flow, conduit, tube and heat transfer connections. Inlet tube 30*a* for the liquid influent 48 can be fluid communication or connected with sump 36 via counter flow heat exchanger 24 and conduit 82. The outlet tube 30*b* for the liquid distillate 56 can be in fluid communication or connected with evaporator/condenser 18 via conduit 66 and counter flow heat exchanger 34. The outlet tube 30*c* for liquid concentrate 58 can be in fluid communication or connected with evaporator/condenser 18 via conduit 84 and counter heat exchanger 24. The sump 36 can be in fluid communication or connected with evaporator/condenser 18 by delivery system 68. The evaporator 18*a* and the condenser 18*b* can be in fluid or gas communication or connected with each other by the conduit 62, compressor 34 and conduit 64 connected therebetween. Boiler supply pump 22 can be in fluid communication or connected with condenser 18*b* and can be in fluid communication or connected with boiler 40 via conduit 70, heat exchanger 72, and conduit 42. Boiler 40 can be in fluid or gas communication or connected with turbine 20 by conduit 44 and inlet 75. The outlet of turbine 20 can be in fluid or gas communication or connected with heat exchanger 72 by conduit 78, which can also be in fluid communication or connected with condenser 18*b* via conduit 80. Electric generator 14 and/or fuel cell 14*a* can be in thermal communication with boiler 40.

Incoming liquid influent 48 entering the vapor compression distiller 12 via tube 30*a* can be preheated in counter flow heat exchanger 24 by outgoing distillate 56 and concentrate 58 liquids which exit via tubes 30*b* and 30*c*, respectively. The heated liquid influent 48 travels by conduit 82 into the sump 36 and is delivered from the sump 36 to the evaporating surfaces 19*a* in the evaporator 18*a* of the evaporator/condenser 18 by sump pump 21 and delivery system 68. Vapor or steam 60 for subsequent condensing is evaporated from liquid influent 48 on the evaporating surfaces 19*a* and is drawn or pumped into the vapor compressor 34 through conduit 62 therebetween, compressed by compressor 34, and delivered from compressor 34 to the condensing surfaces 19*b* in condenser 18*b* of the evaporator/condenser 18, via conduit 64. Vapor 60 condenses on the condensing surfaces 19*b* into liquid distillate 56 such as distilled water. A portion of the distillate 56 collected is pumped by distillate pump 35 (FIG. 1) to exit the vapor compression distiller 12 via conduit 66, counter flow heat exchanger 24 and tube 30*b*. Liquid concentrate 58 remaining from distillation of the liquid influent 48 into distillate 56 is pumped by concentrate pump 33 from evaporator/condenser 18 via conduit 84 through counter flow heat exchanger 24 to exit via tube 30*c*. Another portion of the distillate 56 can be pumped by boiler supply pump 22 via conduit 70 to a heat exchanger 72 such as a heat recovery heat exchanger, and conduit 42 to boiler 40. Heat from the fuel cell 14*a* can heat the liquid distillate 56 or water in the boiler 40 to produce high pressure super heated working vapor or steam 74. The heat exchanger 72 can be a counter flow heat exchanger, or other suitable style heat exchangers. The steam 74 can be delivered via conduit 44 to the inlet 75 of the turbine 20 for expanding and mechanically driving the turbine 20 and connected vapor compressor 34, which can eliminate the need for using electrical power for driving the vapor compressor 34. Expanded or spent waste vapor or steam 76 exiting the turbine 20 can be conveyed by a conduit 78 to heat exchanger 72 for preheating liquid distillate 56 before entering boiler 40 and cooling the waste vapor or steam 76. Preheating the distillate 56 further heats the distillate 56 which is already hot, since it has just been condensed from vapor 60. Consequently, the distillate 56 once delivered to the boiler 40 can be heated quickly into working vapor or steam 74. The cooled waste vapor or steam 76 can be conveyed by conduit 80 to the condenser 18*b*, for condensing on condensing surfaces 19*b*, and can mix with the vapor 60 from the compressor 34. Cooling the waste vapor or steam 76 allows the waste steam 76 to condense more quickly into liquid distillate 56. As a result, the use of already hot liquid distillate 56 that is further heated in heat exchanger 72 before reaching boiler 40, as well as cooling and delivering cooled waste steam 76 to condenser 18*b* increases operational efficiency. Also, the use of vapor or steam 74 to power vapor compressor 34 in a system already producing heated liquid or water helps improve the efficiency. In some embodiments, the waste vapor or steam 76 from the turbine 20 can be directed to the vapor compressor 34 for delivery to the condenser 18*b*. In other embodiments, waste vapor or steam 76 can be directed to the boiler 40, such as after passing through heat exchanger 72.

Positioning the fuel cell 14 and boiler 40 along the central longitudinal axis A can align or direct the working vapor or steam 74 from the boiler 40 for efficient delivery of the steam 74 to the turbine 20 via conduit 44 with minimal pressure or flow rate loss. Portions of conduit 44 can extend slightly offset from the axis A in a generally parallel orientation, and align with the turbine blades 20*b* of the turbine 20, since the turbine 20 is rotatably mounted about axis A. The rotor 25 including the turbine 20 can be positioned adjacently above the sump 36 to be in close proximity to boiler 40. This can minimize the length of conduit 44 for delivering working vapor or steam to turbine 20. In some embodiments, the liquid influent 48 in the sump 36 or delivered on the evaporating surfaces 19*a* can be additionally heated to a temperature suitable for evaporation by one or more of the generator 14 or fuel cell 14*a*, boiler 40, multiple effect thermal system 46 and any electric motors and electric heaters if any in the system.

The use of a Rankine cycle in distilling device 10 allows the device 10 to be electrically energy efficient, making it more economical, and can be suitable for use in remote locations. Such a reduced electric load in conjunction with the corresponding processing water or liquid use capacity from the incoming liquid influent 48, can be optimized to allow the use of batteries and holding or discharge tanks The waste heat from the thermodynamic cycle can be more than enough to make-up for heat normally lost from the system via the streams of distillate 56 and concentrate 58 liquids exiting tubes 30b and 30c. This can allow lower effective or efficient counter flow heat exchangers to be used, or heat can be vented as vapor or steam or along with noncondensible gases from the evaporator/condenser 18. In some embodiments, waste heat can also be used for other suitable purposes. In some embodiments, the processed distillate 56 can be separated into cooler and hotter portions locations or reservoirs, such as by a heat pump, to facilitate or provide hot or cold liquid or water at a point of use.

In one embodiment of distilling device 10, the vapor compression distiller 12 can have a 20 gal/hr. capacity. The generator 14 can have a solid oxide fuel cell 14a capable of producing about 500 watts of power at about 30% efficiency. The fuel 27 requirements can be about 1667 watts of fuel in, and can produce about 1166 watts of heat along with the electrical power. The 1166 watts of heat can operate a Rankine cycle or heat engine as described, which can run the vapor compressor 34. About 20 watts of electrical power can be used to operate the electrical controls 26, user interface and sensors. As a result, distilling device 10 can produce about 480 watts of electrical power and treat 22 gal/hr. of liquid influent 48, producing about 20 gal/hr. of distillate 56, which can be sufficient for use by an average household. In some embodiments, a distilling device 10 having a 20 gal/hr. capacity can have a vapor compression distiller 12 that is about 10 inches in diameter including the dewar 16, and about 36 inches long including the dewar 16.

In some embodiments, the electrical generator 14 can include an internal combustion engine, and can be located outside the dewar 16. The internal combustion engine can heat the boiler 40 for producing working vapor or steam 74 for driving turbine 20 and vapor compressor 34. In some embodiments, the engines described herein for the distilling device 15 can be considered to include a combustor, or can also be considered motors or heat sources.

Figure 3:
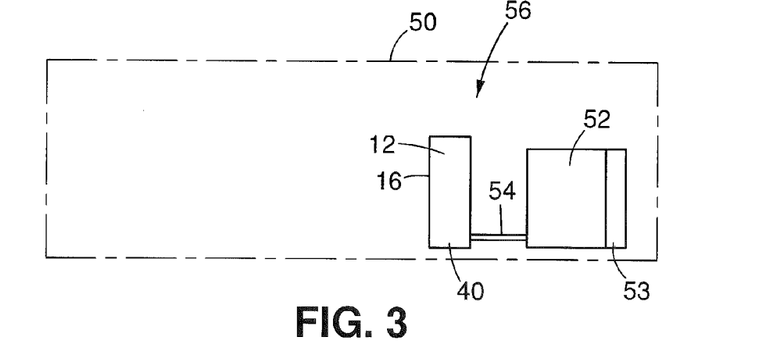
FIG. 3 is a schematic drawing of an embodiment of a distilling device within a vehicle.

Referring to FIG. 3, in one embodiment, distilling device 56 can be installed on or within a vehicle 50, such as a motor vehicle, a water craft or an aircraft. The vehicle 50 can have an engine 52 for powering the vehicle 50 for moving the vehicle 50, or for powering other functions in the vehicle 50. The engine 52 can be an internal combustion engine, turbine engine, or other suitable engine. The distilling device 56 can include a vapor compression distiller 12 as previously described, that is positioned within a dewar 16. The engine 52 can be thermally connected to the boiler 40 within the dewar 16 by thermal connections 54. Heat from the engine 52 can be delivered to the boiler 40 to produce working vapor or steam 74 to drive turbine 20 and vapor compressor 34. The thermal connections 34 can include a circulating system. In another embodiment, the boiler 40 can be positioned outside of the dewar 16, and can be included with the engine 52. In such an embodiment, working vapor or steam 74 would be delivered into the dewar 16. In some embodiments, the engine 52 can include an electric generator 53 which can be driven by the engine 52 for generating electricity.

The distilling device 10 in the present invention can be used for distilling water, as well as other suitable liquids, including spirits such as alcohol. The turbine 20 can be driven by steam 74 from water or by vapor from other liquids being processed. The fuel cell 14a, multiple effect thermal system 46 and engine 52 such as an internal combustion engine, in some embodiments of the present invention, can operate through the use of fuel 27. In some embodiments, the fuel 27 is combusted. In some embodiments of the present invention, a solid oxide fuel cell 14a can be considered an engine or a heat engine. In some embodiments, the generators can be operated by engines using gasoline, diesel fuel, natural gas, etc.

While this invention has been particularly shown and described with references to example embodiments thereof, it will be understood by those skilled in the art that various changes in form and details may be made therein without departing from the scope of the invention encompassed by the appended claims. For example, various components of the embodiments can be omitted or combined together. In addition, the distilling device 10 and components thereof can have different sizes, capacities and capabilities, depending upon the situation at hand. In some embodiments, the engine, combustor or heat source providing heat to the boiler does not have to produce electricity for powering the distilling device. In such a case grid power can be provided to the distilling device which will have reduced electrical power needs.

What is claimed is:

1. A distilling device comprising:
    a vapor compression distiller comprising:
        a reservoir for receiving liquid for distillation,
        evaporation surfaces for receiving the liquid and evaporating the liquid into vapor,
        condensing surfaces for receiving the vapor and condensing the vapor into distillate, and
        a compressor for delivering the vapor to the condensing surfaces;
    an engine that produces heat;
    a boiler heated by the heat from the engine for producing a working vapor;
    a vapor turbine driven by the working vapor, the vapor turbine incorporated as part of the vapor compression distiller and being mechanically coupled to the compressor for mechanically driving the compressor, thereby reducing electrical power needs of the vapor compression distiller; and
    an elongate dewar comprising:
        an upright housing having an upper interior space and a lower interior space separated from each other by a gas and liquid tight sealed barrier wall, and wherein the reservoir, the vapor compression distiller, and the vapor turbine are located in the upper interior space of the upright housing, and the boiler is located in the lower interior space of the upright housing, the boiler being in fluid communication with the vapor turbine that is located in the upper interior space adjacently above the reservoir by a vapor conduit for delivering the working vapor to the vapor turbine.

2. The distilling device of claim 1 in which the working vapor is steam and the vapor turbine is a steam turbine.

3. The distilling device of claim 1 in which the engine is included in an electric generator for generating electricity for powering selected components of the distilling device.

4. The distilling device of claim 3 in which the electric generator includes an internal combustion engine.

5. The distilling device of claim 3 in which the electric generator comprises a solid oxide fuel cell (SOFC) that provides waste heat.

6. The distilling device of claim 5 in which the vapor compression distiller and the SOFC are enclosed within a generally cylindrical dewar.

7. The distilling device of claim 6 in which the vapor compression distiller and the SOFC are separated from each other by the sealed barrier wall.

8. The distilling device of claim 7 in which the sealed barrier wall forms a sump for the vapor compression distiller, for storing liquid for distillation.

9. The distilling device of claim 2 in which at least a portion of water provided to the boiler is provided from at least one of exhaust steam from the turbine and distillate from the condensing surfaces.

10. The distilling device of claim 9 in which at least a portion of exhaust steam from the steam turbine is delivered to the condensing surfaces for condensing into distillate.

11. The distilling device of claim 1 in which the vapor compression distiller is mounted to a vehicle and the engine drives the vehicle.

12. The distilling device of claim 10 in which fuel combustion heats the boiler.

13. The distilling device of claim 3 further comprising a multiple effect thermal system for concentrating, drying and burning solids separated from the liquid received by the vapor compression distiller during distillation, wherein heat produced by burning the solids, supplements heat from the electric generator.

14. The distilling device of claim 2 in which the compressor and the steam turbine are mounted to a common shaft positioned along a central axis of the vapor compression distiller, and rotate in unison.

15. The distilling device of claim 2 in which at least a portion of exhaust steam from the steam turbine is used to preheat water provided to the boiler.

16. A distilling device comprising:
a vapor compression distiller comprising:
a reservoir for receiving liquid for distillation, evaporation surfaces for receiving the liquid and evaporating the liquid into vapor, condensing surfaces for receiving the vapor and condensing the vapor into distillate, and a compressor for delivering the vapor to the condensing surfaces;
an engine that emits high temperature waste heat of at least 500 C.; a boiler heated by the waste heat from the engine for producing steam;
a steam turbine driven by the steam, the steam turbine incorporated as part of the vapor compression distiller and being mechanically coupled to the compressor for mechanically driving the compressor, thereby reducing electrical power needs of the vapor compression distiller, at least a portion of water provided to the boiler is provided from the distillate from the condensing surfaces; and
an elongate dewar comprising:
an upright housing having an upper interior space and a lower interior space separated from each other by a gas and liquid tight sealed barrier wall, and wherein the reservoir, the vapor compression distiller, and the steam turbine are located in the upper interior space of the upright housing, and the boiler is located in the lower interior space of the upright housing, the boiler being in fluid communication with the steam turbine that is located in the upper interior space adjacently above the reservoir by a steam conduit for delivering the steam to the steam turbine.

17. The distilling device of claim 16 in which at least a portion of exhaust steam from the steam turbine is delivered to a heat exchanger for preheating the water entering the boiler, before being delivered to the condensing surfaces for condensing into distillate.

18. The distilling device of claim 16 in which the vapor compression distiller is mounted to a vehicle, and the engine drives the vehicle.

19. A distilling device comprising:
a vapor compression distiller comprising:
a reservoir for receiving liquid for distillation, evaporation surfaces for receiving the liquid and evaporating the liquid into vapor, condensing surfaces for receiving the vapor and condensing the vapor into distillate, and a compressor for delivering the vapor to the condensing surfaces;
a combustor for combusting fuel and producing heat; a boiler heated by heat from the combustor for producing steam, the boiler being provided with distillate from the condensing surfaces;
a steam turbine driven by the steam, the steam turbine incorporated as part of the vapor compression distiller and being mechanically coupled to the compressor for mechanically driving the compressor, thereby reducing electrical power needs of the vapor compression distiller, at least a portion of exhaust steam from the steam turbine being delivered to the condensing surfaces for condensing into distillate; and
an elongate dewar comprising:
an upright housing having an upper interior space and a lower interior space separated from each other by a gas and liquid tight sealed barrier wall, and wherein the reservoir, the vapor compression distiller, and the steam turbine are located in the upper interior space of the upright housing, and the boiler is located in the lower interior space of the upright housing, the boiler being in fluid communication with the steam turbine that is located in the upper interior space adjacently above the reservoir by a steam conduit for delivering the steam to the steam turbine.

20. The distilling device of claim 19 in which at least a portion of exhaust steam from the steam turbine is delivered to a heat exchanger for preheating water entering the boiler.

21. The distilling device of claim 19 further comprising a multiple effect thermal system for concentrating, drying, and burning solids separated from the liquid received by the vapor compression distiller during distillation, the multiple effect system being driven by the combustor.

22. A method of distilling liquid within the distilling device of claim 1 comprising:
with the vapor compression distiller, receiving liquid in the reservoir for distillation,
applying the liquid onto the evaporation surfaces and evaporating the liquid into vapor,
delivering the vapor onto the condensing surfaces and condensing the vapor into distillate, the vapor being delivered to the condensing surfaces by the compressor;
producing heat with the engine;
heating the boiler with the heat from the engine for producing the working vapor; and
driving the vapor turbine with the working vapor, the vapor turbine being mechanically coupled to the compressor for mechanically driving the compressor, thereby reducing electrical power needs of the vapor compression distiller.

23. The method of claim 22 further comprising producing steam with the boiler as the working vapor and configuring the vapor turbine as a steam turbine.

24. The method of claim 22 further comprising including the engine in an electric generator for generating electricity for powering selected components of the distilling device.

25. The method of claim 24 further comprising providing the electric generator with an internal combustion engine.

26. The method of claim 24 further comprising providing the electric generator with a solid oxide fuel cell (SOFC) that provides waste heat.

27. The method of claim 26 further comprising enclosing the vapor compression distiller and the SOFC within a generally cylindrical dewar.

28. The method of claim 27 further comprising separating the vapor compression distiller and the SOFC from each other by the sealed barrier wall.

29. The method of claim 28 further comprising configuring the sealed barrier wall into a sump for the vapor compression distiller, for storing liquid for distillation.

30. The method of claim 23 further comprising providing at least a portion of water to the boiler from at least one of exhaust steam from the turbine and distillate from the condensing surfaces.

31. The method of claim 30 further comprising delivering at least a portion of exhaust steam from the steam turbine to the condensing surfaces for condensing into distillate.

32. The method of claim 22 further comprising mounting the vapor compression distiller to a vehicle and driving the vehicle with the engine.

33. The method of claim 31 further comprising combusting fuel to heat the boiler.

34. The method of claim 23 further comprising providing a multiple effect thermal system for concentrating, drying and burning solids separated from the liquid received by the vapor compression distiller during distillation, wherein heat produced by burning the solids, supplements heat from the electric generator.

35. The method of claim 22 further comprising mounting the compressor and the steam turbine to a common shaft positioned along a central axis of the vapor compression distiller, and rotating in unison.

36. The method of claim 23 further comprising using at least a portion of exhaust steam from the steam turbine to preheat water provided to the boiler.

37. A method of distilling liquid with the distilling device of claim 16 comprising:
with the vapor compression distiller, receiving liquid in the reservoir for distillation,
applying the liquid onto the evaporation surfaces and evaporating the liquid into vapor, delivering the vapor onto the condensing surfaces and condensing the vapor into distillate, the vapor being delivered to the condensing surfaces by the compressor;
emitting high temperature waste heat of at least 500° C. from the engine;
heating the boiler with the waste heat from the engine for producing steam; and
driving the steam turbine with the steam, the steam turbine being mechanically coupled to the compressor for mechanically driving the compressor, thereby reducing electrical power needs of the vapor compression distiller, at least a portion of water provided to the boiler is provided from the distillate from the condensing surfaces.

38. The method of claim 37 further comprising delivering at least a portion of exhaust steam from the steam turbine to a heat exchanger for preheating the water entering the boiler, before being delivered to the condensing surfaces for condensing into distillate.

39. The method of claim 37 further comprising mounting the vapor compression distiller to a vehicle, and driving the vehicle with the engine.

40. A method of distilling liquid with the distilling device of claim 19 comprising:
with the vapor compression distiller, receiving liquid for distillation in the reservoir,
applying the liquid onto the evaporation surfaces and evaporating the liquid into vapor,
delivering the vapor onto the condensing surfaces and condensing the vapor into distillate, the vapor being delivered to the condensing surfaces by the compressor;
combusting fuel and producing heat with the combustor;
heating the boiler with the heat from the combustor for producing steam, the boiler being provided with distillate from the condensing surfaces; and driving a steam turbine with the steam, the steam turbine being mechanically coupled to the compressor for mechanically driving the compressor, thereby reducing electrical power needs of the vapor compression distiller, at least a portion of the exhaust steam from the steam turbine being delivered to the condensing surfaces for condensing into distillate.

41. The method of claim 40 further comprising delivering at least a portion of exhaust steam from the steam turbine to a heat exchanger for preheating water entering the boiler.

42. The method of claim 40 further comprising providing a multiple effect thermal system for concentrating, drying, and burning solids separated from the liquid received by the vapor compression distiller during distillation, the multiple effect thermal system being driven by the combustor.

* * * * *